(12) United States Patent
Hirate et al.

(10) Patent No.: US 9,988,074 B2
(45) Date of Patent: Jun. 5, 2018

(54) STEERING CONTROL APPARATUS

(71) Applicant: DENSO CORPORATION, Kariya, Aichi-pref. (JP)

(72) Inventors: Yosuke Hirate, Kariya (JP); Motoaki Kataoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 14 days.

(21) Appl. No.: 14/951,229

(22) Filed: Nov. 24, 2015

(65) Prior Publication Data

US 2017/0144696 A1 May 25, 2017

(51) Int. Cl.
*B62D 5/04* (2006.01)

(52) U.S. Cl.
CPC .................................. *B62D 5/0463* (2013.01)

(58) Field of Classification Search
None
See application file for complete search history.

(56) References Cited

U.S. PATENT DOCUMENTS

2013/0060427 A1* 3/2013 Kataoka ................. B62D 6/008
701/42

FOREIGN PATENT DOCUMENTS

JP 2008-254496 A 10/2008
JP 2012-096571 A 5/2012

* cited by examiner

*Primary Examiner* — Rami Khatib
*Assistant Examiner* — Gerrad A Foster
(74) *Attorney, Agent, or Firm* — Knobbe, Martens, Olson & Bear, LLP

(57) ABSTRACT

A steering control apparatus controls steering characteristics by controlling a motor to output assist torque, which is generated corresponding to a steering torque applied to a steering shaft. The steering control apparatus includes a torque deviation generator generating a torque deviation between the steering torque applied to the steering shaft and a target steering torque and a command value generator generating an assist torque command value for controlling the motor based on a basic command value. The basic command value controls the torque deviation to become zero. The command value generator includes an integrator integrating and outputting the torque deviation and an output limiter setting an output limit to an immediately previous basic command value obtained immediately before the basic command value. The output limiter generates the assist torque command value using the immediately previous basic command value to which the output limit is set.

5 Claims, 6 Drawing Sheets

BODE DIAGRAM

STEERING CONTROL APPARATUS

CROSS REFERENCE TO RELATED APPLICATION

This application is based on Japanese Patent Application No. 2013-120850 filed on Jun. 7, 2013, the disclosures of which is incorporated herein by reference.

TECHNICAL FIELD

The present disclosure relates to a steering control apparatus that generates an assist torque to assist an operation of a steering wheel of a vehicle.

BACKGROUND

There has been known a proportional integral (PI) control device and a proportional integral differential (PID) control device each of which outputs a command signal for controlling a measured value of a control target to become equal to a target value. This kind of control device to perform an integration calculation employs a configuration having an output limiter for limiting an upper limit value and a lower limit value of a command signal in order to protect the control target. In this configuration, when the command value exceeds a limit value of the output limiter, the command signal outputted to the control target from the output limiter is saturated by the limit value. Thus, an excessive command signal is restricted from being outputted to the control target.

In the above-described control device, the output limiter sets a limit value to limit an integration result integrated by an integral element (I). Under this configuration, since the control signal keeps a saturated state until the integration result becomes equal to or lower than the limit value, a response characteristic may be deteriorated. This kind of phenomenon is also known as a reset windup. In order to restrict this kind of reset windup, various solutions are provided to the control device.

For example, JP 2013-52793 A (corresponding to US 2013/0060427 A) discloses a steering control apparatus, which is referred to as a conventional apparatus hereinafter. The conventional apparatus regulates, using an assist torque generated by a motor, a steering feeling which is transferred to a driver during an operation of a steering wheel. An assist controller used in the conventional apparatus is configured to output a control signal, specifically an assist torque signal for controlling the motor so that a steering torque becomes equal to a target steering torque.

The assist controller includes a controller at least including a differential element (D) and an output limiting integrator, which functions as an integral element (I) and is provided at a stage before the controller. The controller and the output limiting integrator execute calculation operation to reduce or eliminate a torque deviation between the target steering torque and the steering torque in order to restrict a reset windup.

In the above-described assist controller, in order to secure the stability of a system, a differential element (D) gradually increases a gain to a predetermined frequency and keeps the gain for the frequencies higher than the predetermined frequency.

In the above-described apparatus, a high frequency component, which is generated when an output from the output liming integrator provided at a former stage becomes to an output limit value, is amplified by a controller provided at a latter stage. Thus, assist torque command signal may sharply change and a vibrating assist torque may be caused by the sharp change of the assist torque command signal. Further, when the vibrating assist torque is transferred to hands of a driver, the driver may receive uncomfortable feeling during the operation of the steering wheel of the vehicle.

SUMMARY

In view of the foregoing difficulties, it is an object of the present disclosure to provide a steering control apparatus that restricts an uncomfortable feeling that is sensed by a driver during an operation of a steering wheel of a vehicle.

According to an aspect of the present disclosure, a steering control apparatus controls steering characteristics by controlling a motor to output an assist torque. The assist torque is generated corresponding to a steering torque applied to a steering shaft that is coupled to a steering member. The steering control apparatus includes a torque deviation generator and a command value generator. The torque deviation generator generates a difference between the steering torque applied to the steering shaft and a target steering torque as a torque deviation. The target steering torque is a target value of the steering torque applied to the steering shaft. The command value generator generates an assist torque command value, which is used for controlling the motor, based on a basic command value. The basic command value is a command value that controls the torque deviation to be reduced to zero. The command value generator includes an integrator and an output limiter. The integrator integrates the torque deviation and outputs the integrated torque deviation. The output limiter sets an output limit to an immediately previous basic command value, which is obtained immediately before the basic command value. The output limiter generates the assist torque command value using the immediately previous basic command value to which the output limit is set.

With the above apparatus, an uncomfortable feeling that is sensed by a driver during an operation of a steering wheel of a vehicle can be effectively restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe an embodiment of the present disclosure with reference to the drawings.

Figure 1:
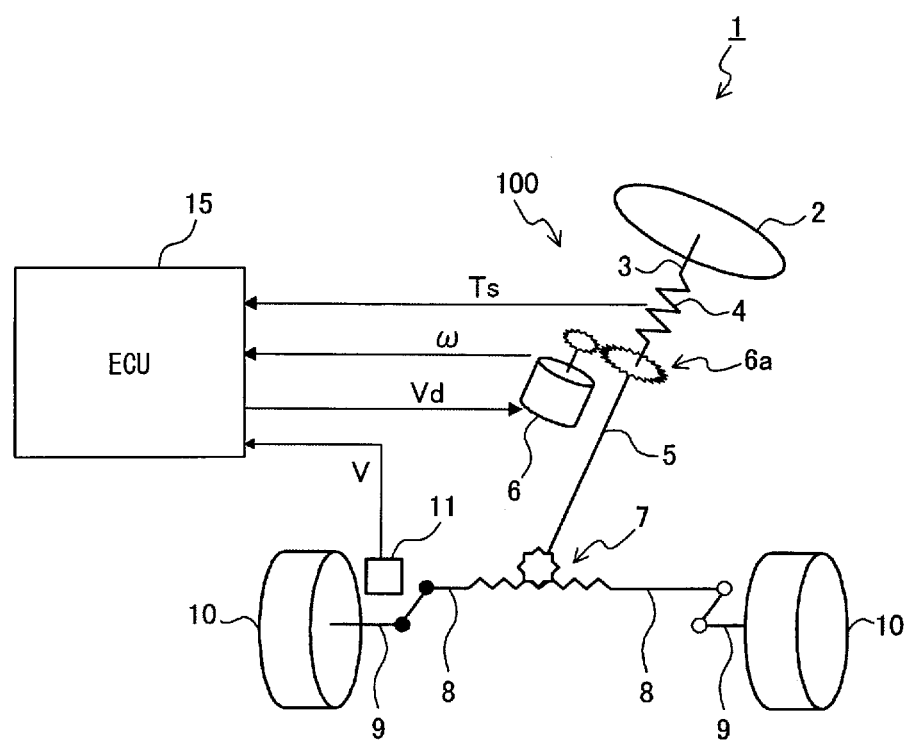
FIG. 1 is a diagram showing a general configuration of an electric power steering system according to an embodiment of the present disclosure.

An electric power steering system 1 of the present embodiment, as shown in FIG. 1, is a system that assists a driver to operate a steering member 2 using a motor 6. In the present disclosure, a steering wheel will be described as an example of the steering member 2. The electric power steering system 1 includes a steering system mechanism 100 and an electronic control unit (ECU) 15. The ECU functions as an example of the steering control apparatus in the present disclosure. In the steering system mechanism 100, the steering wheel 2 is fixed to one end of a steering shaft 3, the steering shaft 3 has a torque sensor 4 connected to the other end of the steering shaft 3, and the torque sensor 4 has an intermediate shaft 5 connected to the other end of the torque sensor 4. In the following description, a whole shaft body including the steering shaft 3, the torque sensor 4, and the intermediate shaft 5 may be collectively referred to as a steering shaft. Further, in the following description, a rotation angle of the steering shaft is also referred to as a steering angle, a rotation angular speed of the steering shaft is also referred to as a steering speed, and a rotation angular acceleration of the steering shaft is also referred to as a steering acceleration.

The torque sensor 4 detects a steering torque Ts. Specifically, the torque sensor 4 has a torsion bar for coupling the steering shaft 3 to the intermediate shaft 5, and detects torque applied to the torsion bar based on a torsion angle of the torsion bar.

The motor 6 assists the steering force of the steering wheel 2. The rotation of the motor 6 is transmitted to the intermediate shaft 5 via a speed reduction mechanism 6a. Specifically, the speed reduction mechanism 6a includes a worm gear, which is fixed to a top of a rotary shaft of the motor 6, and a worm wheel, which is fixed coaxially to the intermediate shaft 5. The worm gear and the worm wheel transmit the rotation of the motor 6 to the intermediate shaft 5. When the intermediate shaft 5 is rotated by the operation applied by the driver to the steering wheel 2 or by a reaction force generated by a road surface, the rotation of the intermediate shaft 5 is transmitted to the motor 6 via the speed reduction mechanism 6a and the motor 6 is rotated by the force transmitted from the intermediate shaft 5. Hereinafter, the reaction force generated by a road surface is also referred to as a road surface reaction force.

In the present embodiment, the motor 6 is provided by a brushless motor and has a rotation sensor such as a resolver. The rotation sensor is able to output a rotational state of the motor 6. As the rotational state of the motor 6, the rotation sensor outputs at least a motor speed w, which is information indicating a rotational angular speed of the motor 6. Here, instead of the motor speed ω, a steering speed acquired by multiplying the motor speed ω by a gear ratio of the speed reduction mechanism 6a may be used as the rotational state of the motor 6.

The intermediate shaft 5 is connected with the torque sensor at one end, and is connected with a steering gear box 7 at the other end that is opposite to the one end. The steering gear box 7 is provided by a gear mechanism including a rack and a pinion gear, and the teeth of the rack engage with the pinion gear. The pinion gear of the steering gear box 7 is fixed to the other end of the intermediate shaft 5. With this configuration, when the driver rotates the steering wheel 2, the intermediate shaft 5 is rotated, that is, the pinion gear is rotated, and the rack is moved to the left or to the right. The rack has tie rods 8 fixed to both ends thereof and the tie rods 8 are reciprocated to the left and to the right along with the rack. The tie rods 8 pull or push knuckle arms 9, which are fixed to the tips of the tie rods 8. With this configuration, the directions of the respective tires 10 of the steering wheels are changed.

The vehicle may further include a vehicle speed sensor (VH SPEED SENSOR) 11 which detects a vehicle speed V. The vehicle speed sensor 11 may be equipped to the vehicle at a specified portion.

With this configuration, when the driver rotates (steers) the steering wheel 2, the rotation of the steering wheel 2 is transmitted to the steering gear box 7 via the steering shaft 3, the torque sensor 4, and the intermediate shaft 5. Then, in the steering gear box 7, the rotation of the intermediate shaft 5 is transformed to the left or right movement of the tie rods 8, and tie rods 8 are moved in left or right direction for steering the left and right tires 10 in left or right direction.

The ECU 15 is supplied with electric power by a vehicle-mounted battery (not shown) and calculates an assist torque command Ta based on the steering torque Ts detected by the torque sensor 4, the motor speed ω of the motor 6, and the vehicle speed V detected by the vehicle speed sensor 11. Then, the ECU 15 applies a drive voltage Vd corresponding to the result of calculation to the motor 6, for controlling an assist of a force provided to the driver during the rotation of the steering wheel 2. The operation made by the driver on the steering wheel 2 generates a force for steering the driving tires 10.

In the present embodiment, the motor 6 is a brushless motor and the drive voltage Vd outputted or applied to the motor 6 from the ECU 15 is a three-phase (U, V, W) voltage. Specifically, the drive voltage Vd includes three drive voltages Vdu, Vdv, Vdw. The ECU 15 applies, to the motor 6, these drive voltages Vdu, Vdv, Vdw corresponding to the respective phases by flowing three drive currents corresponding to the respective phases to the motor 6. By applying the driving voltages, the rotation torque of the motor 6 is controlled. A method for driving a brushless motor by the drive voltages of three phases (for example, PWM drive) and a drive circuit for generating the drive voltages of three phases (for example, three-phase inverter) have been well known, and detailed descriptions will be omitted here.

The ECU 15 controls the drive voltage Vd applied to the motor 6 for controlling the motor 6. That is, the ECU 15 controls the motor 6 for controlling the steering system mechanism 100. Thus, a control target to be controlled by the ECU 15 is the steering system mechanism 100. The steering system mechanism 100 designates a whole mechanism excluding the ECU 15 in a system configuration diagram shown in FIG. 1. That is, the steering system mechanism 100 includes a whole mechanism from the steering wheel 2 to the respective wheels 10, to which the steering force of the steering wheel 2 is transmitted.

Figure 2:
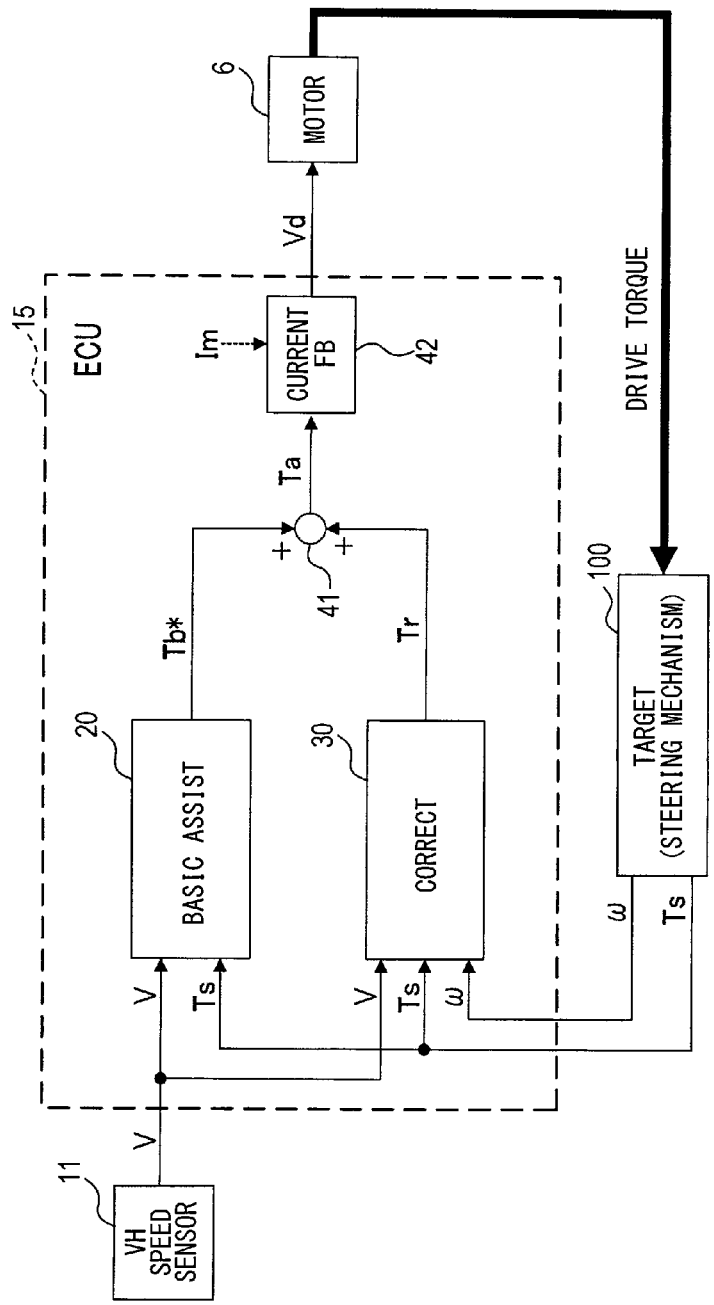
FIG. 2 is a diagram showing a general configuration of a control mechanism of an ECU.

The following will describe a general configuration and a control mechanism of the ECU 15 with reference to a block diagram shown in FIG. 2. In the ECU 15 shown in FIG. 2, the whole functions of the components except a current feedback (FB) unit 42 and partial function of the current FB unit 42 are provided by an execution of a predetermined control program by a CPU, which is included in the ECU 15 and is not shown. FIG. 2 shows various functions realized by the CPU as function blocks. The realization of the control mechanism shown in the drawings by software is only one example, and needless to say, the whole or partial components of the control mechanism shown in FIG. 2 may be realized by hardware, for example, a logic circuit or the like.

As shown in FIG. 2, the ECU 15 includes a basic assist unit (BASIC ASSIST) 20, a correction unit (CORRECT) 30, an adder 41, and the current FB unit (CURRENT FB) 42. The basic assist unit 20 generates a basic assist command (basic command value) Tb*. The correction unit 30 generates a correction torque command Tr. The adder 41 adds the correction torque command Tr to the basic assist command Tb*, and generates an assist torque command (assist torque command value) Ta. The current FB unit 42 applies, to the motor 6, the drive voltage Vd generated based on the assist torque command Ta. By applying the drive voltage Vd to the motor, a corresponding drive current flows through the motor 6 and the motor 6 is driven by the current.

The basic assist unit 20 implements characteristics of a steering reaction force on the basis of road surface reaction force (road surface load). More specifically, the basic assist unit 20 permits a reaction (reaction force) corresponding to the road surface load to be quasi-steadily transmitted to the driver so that the driver is able to easily grasp a state of the vehicle and a state of the road surface. The basic assist unit 20 also provides improved steering feel by adjusting the sense of touch, which includes hardness, stickiness, and heaviness of tires felt via the steering wheel. Herein, the sense of touch is transmitted to the driver corresponding to a steering state. Based on the steering torque Ts and the vehicle speed V, the basic assist unit 20 generates the basic assist command Tb* to assist the operation of the steering wheel 2. By the basic assist command Tb*, a force generated by the road surface load can be transmitted to the driver in a sensible manner and a steering feel corresponding to the steering state can be provided to the driver.

The correction unit 30 controls the transmission of vehicle motion characteristics and a steering mechanism system for the operation of the steering wheel to meet an intension of the driver. Specifically, the correction unit 30 controls the vehicle to suitably converge or to smoothly make a turn. The correction unit 30 generates the correction torque command Tr for restricting (converging) the unstable behavior described above based on the steering torque Ts, the motor speed ω, and the correction torque command Tr.

The adder 41 generates the assist torque command Ta by adding the correction torque command Tr, which is generated by the correction unit 30, to the basic assist command Tb*, which is generated by the basic assist unit 20.

The current FB unit 42 applies the drive voltage Vd to the motor 6 on the basis of the assist torque command Ta so that an assist torque, that is, an assist steering force corresponding to the assist torque command Ta is provided to the steering shaft, more specifically, to a portion between the torque sensor 4 and the tires 10. Based on the assist torque command Ta, the current FB unit 42 sets a target current (phase-specific target current) to be applied to each phase of the motor 6. The current FB unit 42 then detects and feeds back the current Im applied to each phase, and generates a desired assist torque for the steering shaft by controlling the drive voltage Vd, that is, controlling the current Im in such a manner that the detected value, that is, the current Im applied to each phase agrees becomes equal to the target current.

The correction unit 30 and the current FB unit 42 are well-known technologies. Refer to JP 2013-52793 A for the correction unit and the current FB unit, and details related to the correction unit 30 and the current FB unit 42 will not be described. The following will describe the basic assist unit 20, which relates to an essential portion of the present disclosure, in detail.

Figure 3:
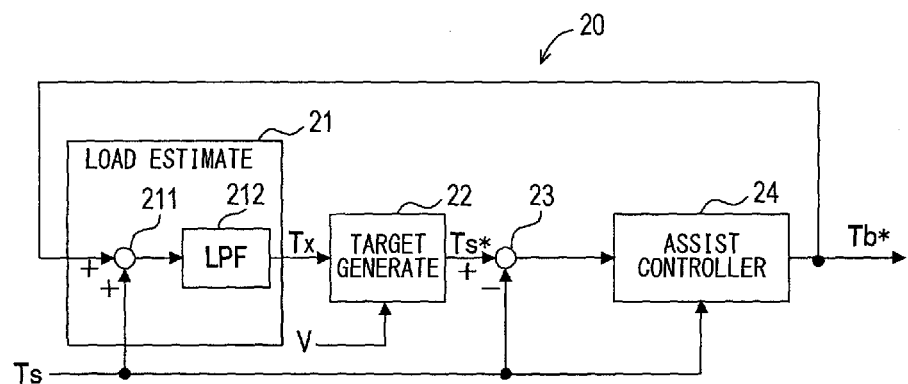
FIG. 3 is a diagram showing a configuration of a basic assist unit.

As shown in FIG. 3, the basic assist unit 20 includes a load estimator (LOAD ESTIMATE) 21, a target generator (TARGET GENERATE) 22, a deviation calculator 23, and an assist controller 24.

The load estimator 21 estimates a load surface load based on the basic assist command Tb* and the steering torque Ts. Specifically, the load estimator 21 includes an adder 211, which adds the steering torque Ts to the basic assist command Tb*, and a low pass filter (LPF) 212, which extracts a component of a frequency band lower than a specified frequency from the addition result. The load estimator 21 outputs a frequency component extracted by the LPF 212 as an estimated load Tx. Usually, the driver operates the vehicle mainly with the aid of steering reaction force information having frequencies lower than 10 Hz. Thus, the LPF 212 is set to pass (extract) frequency components approximately equal to or lower than 10 Hz and to block frequency components higher than 10 Hz.

The target generator 22 generates a target steering torque Ts*, which is a target value of the steering torque, by which the driver can feel that an steering wheel operation is heavy or light according to the road surface reaction force (estimated load Tx) estimated by the load estimator 21 or by which a degree of increase (gradient) in the steering reaction force (or steering torque) of the driver for an increase in the road surface reaction force is realized. The target generator 22 of the present embodiment, in reality, generates the target steering torque Ts* based on a map in which the target steering torque Ts* is set to correspond to the estimated load Tx and the vehicle speed V.

The deviation calculator 23 calculates a torque deviation, which is a difference between the steering torque Ts and the target steering torque Ts*.

The assist controller 24 is configured to perform a well-known PID control and controls the steering torque Ts so that the torque deviation is reduced to zero. That is, the assist controller 24 controls the steering torque Ts so that the steering torque Ts follows the target steering torque Ts* based on the torque deviation (the difference between the steering torque Ts and the target steering torque Ts*), thereby generating the basic assist command Tb* for generating an assist torque (also referred to as assist) to realize the transmission feeling corresponding to the road surface load and the steering feeling corresponding to the steering state.

Figure 4:
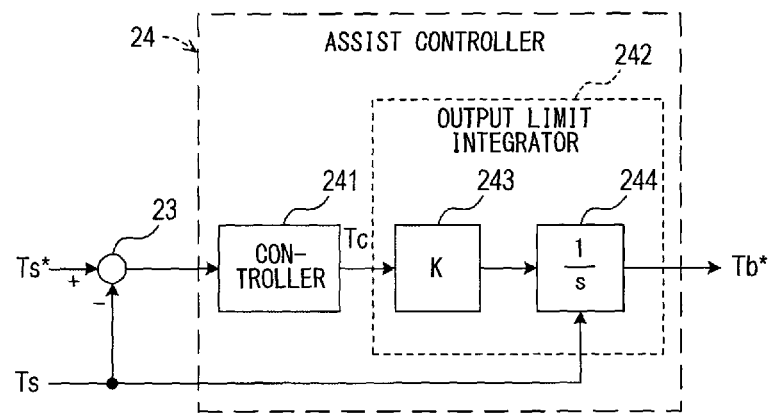
FIG. 4 is a diagram showing a configuration of an assist controller.

Specifically, as shown in FIG. 4, the assist controller 24 includes a controller 241 and an output limiting integrator (OUTPUT LIMIT INTEGRATOR) 242. The frequency characteristics of the assist controller 24 will be shown by solid lines in FIG. 5A and FIG. 5B. Gain characteristic of the assist controller 24 is set in the following manner. The gain is high (more than 10 times) in low frequency area (approximately less than 1 Hz), and gradually decreases from a frequency higher than 1 Hz to secure the stability of the steering system mechanism 100. The gain is gradually increased in frequencies from 10 Hz to 200 Hz by a differential element. The characteristics of the assist controller 24 are set as characteristics into which the frequency characteristics of the controller 241 and the frequency characteristics of the output limiting integrator 242 are synthesized.

The controller 241 includes a differential element (D) and a proportional element (P). The controller 241 has an input of the torque deviation between the target steering torque Ts* and the steering torque Ts, and outputs a calculation torque command Tc as a calculation result to the output limiting integrator 242.

Figure 5A:
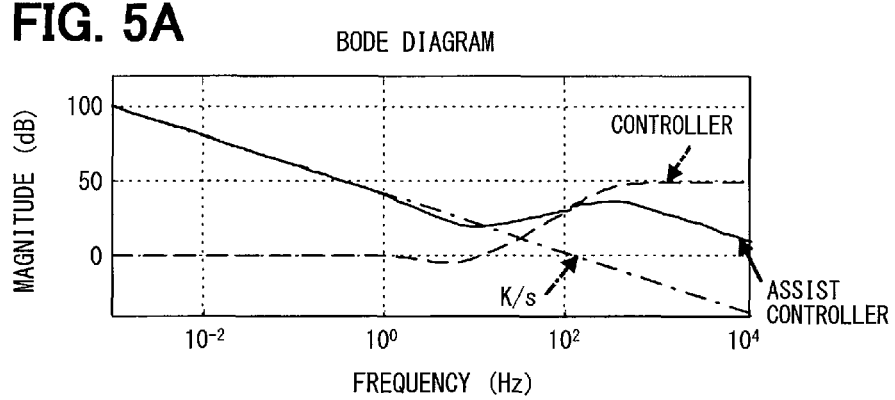
FIG. 5A is a graph showing gain characteristics in relation to the frequencies in an assist controller.
Figure 5B:
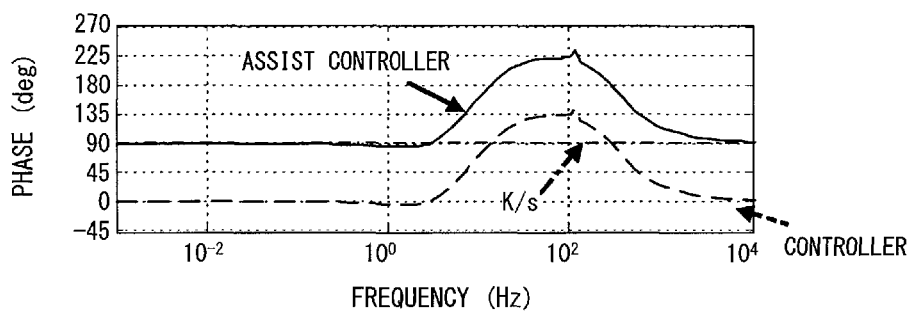
FIG. 5B is a graph showing phase characteristics in relation to the frequencies in an assist controller.

The frequency characteristic of the controller 241 is shown by dashed lines in FIG. 5A and FIG. 5B. The gain characteristics are set in the following manner. The gain is set to zero decibel (dB) in a range approximately equal to or less than 10 Hz, the gain gradually increases in a range from 10 Hz to 200 Hz, and the gain is maintained without change in a range of high frequency more than 200 Hz.

The output limiting integrator 242 includes a gain K 243 and an integrator 244 which are connected in series, and has an upper limit set to the absolute value of the integrated output. Specifically, the output limiting integrator 242 has a function of a well-known limiter for limiting the absolute value of the integrated output so that the absolute value of the integrated output is prevented from becoming larger than a predetermined value (referred to as "an integrated upper limit value") which is obtained by multiplying the absolute value of the calculation torque command Tc outputted from the controller 241 by specified times. The frequency characteristics of the output limiting integrator 242 will be shown by single dot and dash lines in FIG. 5A and FIG. 5B. The gain characteristics show that a characteristic (K/s) decreases at a specified rate with an increase of the frequency.

In order to realize the assist controller 24 having the characteristics shown in FIG. 5A and FIG. 5B by digital signal processing performed by a microcomputer, the transfer function of each constituent element needs to be made discrete. Although any method can be used to make the transfer function of each constituent element discrete, in the present embodiment, the transfer function of each constituent element is made discrete by using bilinear transformation.

Figure 6:
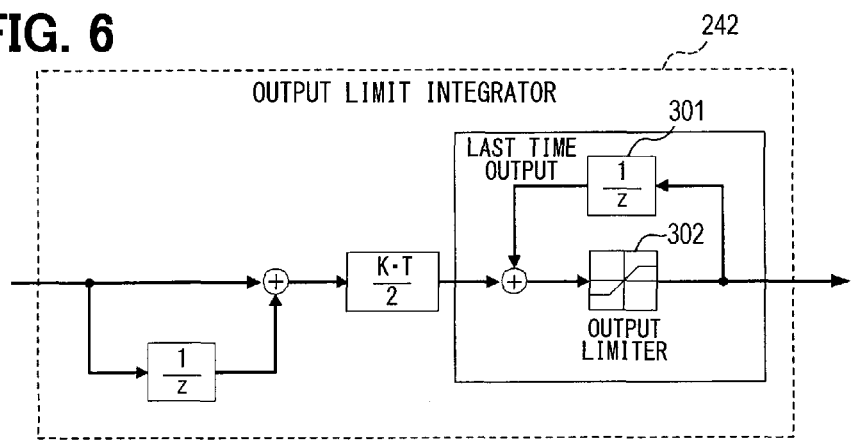
FIG. 6 is a diagram showing a configuration of an output limiting integrator including discrete elements.

FIG. 6 shows a block diagram in which the transfer function is made discrete by substituting the bilinear transformation of $s=2/T \times (1-z^{-1})/(1+z^{-1})=2/T \times (z-1)/(z+1)$ for the output limiting integrator 242 shown in FIG. 4. In FIG. 6, T indicates a sampling time, a reference numeral 301 indicates a delay element and a reference numeral 302 indicates an output limiter.

In the present embodiment, the output limiting integrator 242 is configured to use the integrated upper limit value outputted from the output limiter 302 as an immediately previous output value (last time output value) which is used at the time of performing the integration calculation.

As described above, in the electric power steering device 1 of the present embodiment, the assist controller 24 has the output limiting integrator 242 provided at the last stage, and the output limiting integrator 242 sets an upper limit to the absolute value of the integrated output. The output limiting integrator 242 is configured to perform the integration calculation by using an output value after passing the output limiting integrator as the immediately previous output value. In this way, the reset windup in the integration calculation can be restricted.

In the assist controller 24, an integrated value is restricted from being accumulated more than necessary by rotating back the steering wheel. Thus, in the electric power steering device 1, assistance force in a steering direction until the time of rotating back of the steering wheel is not continuously increased more than necessary and is decreased. Thus, an inhibition of steering the steering wheel in a rotating-back direction by the accumulated integrated value can be restricted. As a result, in the electric power steering device 1, it is possible to restrict the driver from receiving an uncomfortable feeling when the driver operates the steering wheel of the vehicle.

Figure 7A:
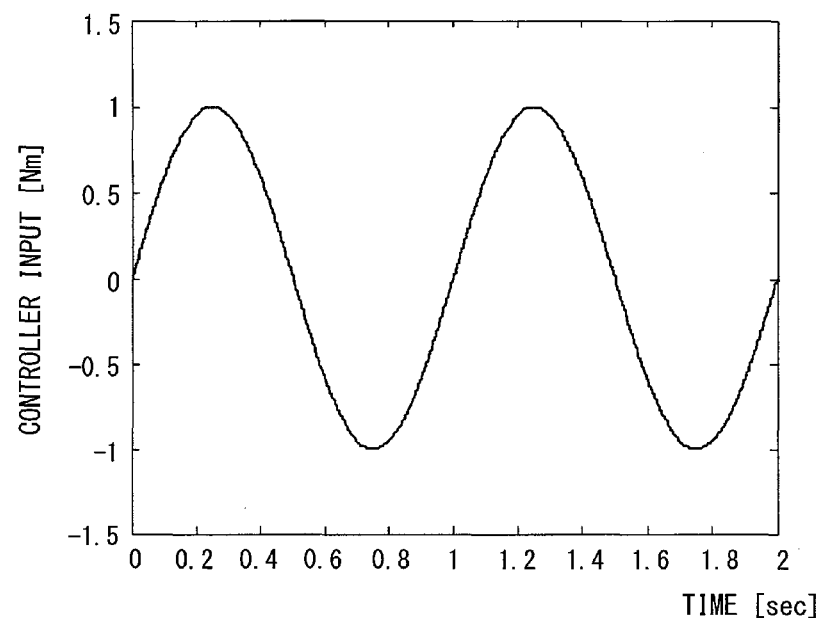
FIG. 7A is a graph showing an input waveform to assist controllers.
Figure 7B:
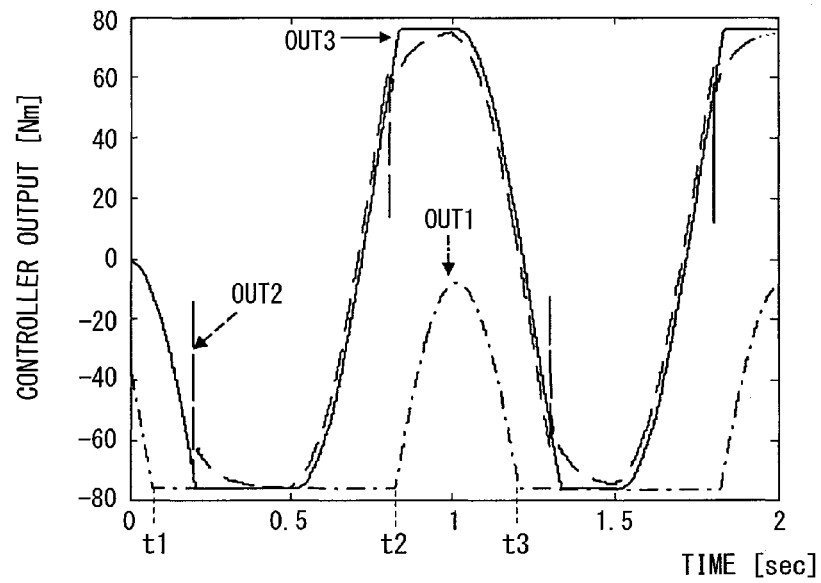
FIG. 7B is a graph showing output waveforms from assist controllers.

FIG. 7A is graph showing a sine wave having amplitude of 1 Nm and a frequency of 1 Hz (see FIG. 7A) inputted to the assist controller 24 of the present embodiment. FIG. 7B shows graphs of output waveforms. In FIG. 7B, a waveform OUT3 indicated by a solid line is an output waveform from the assist controller 24 of the present embodiment. In FIG. 7B, a waveform OUT1 indicated by a dashed-dotted line is an output waveform from an exemplary assist controller 24a having a configuration shown in FIG. 8A for comparison. In FIG. 7B, a waveform OUT2 indicated by a dashed line is an output waveform from an exemplary assist controller 24b having a configuration shown in FIG. 8B for comparison.

Figure 8A:
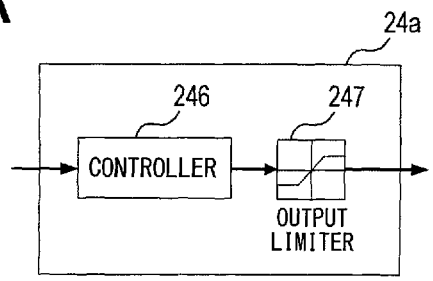
FIG. 8A is a diagram showing a comparison configuration of an assist controller having an output limiter provided at a last stage.

Here, the assist controller 24a shown in FIG. 8A has a configuration in which the assist controller 24 of the present embodiment is divided into an output limiter 247 and a controller 246 other than the output limiter 247 and in which the output limiter 247 is provided at the last stage. In the assist controller 24a, as shown by the dashed-dotted line in FIG. 7B, when an input signal is reversed, an output signal cannot quickly respond to the reverse of the input signal and this may cause a deterioration of responsiveness (reset windup). In contrast to this, it can be seen that the assist controller 24 of the present embodiment, as shown by the solid lines in FIG. 7A and FIG. 7B, can output a signal that quickly responds to a change of the input signal.

Figure 8B:
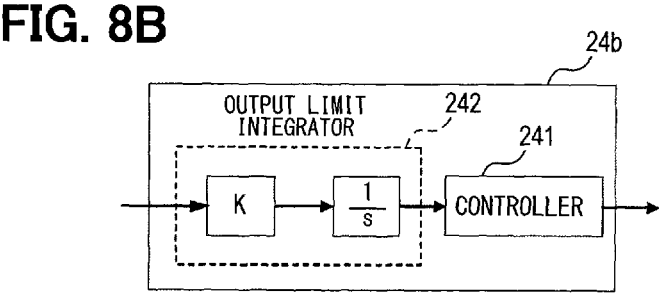
FIG. 8B is a diagram showing a comparison configuration of an assist controller having an output limiting integrator provided at a stage preceding a controller.

On the other hand, an assist controller 24b shown in FIG. 8B has the same constituent element as the assist controller 24 of the present embodiment but is different from the present embodiment in that an output limiting integrator 242 is provided at a stage before a controller 241 (the same as the configuration shown in FIG. 12C of JP 2013-52793 A). In this case, as shown by the dashed line in FIG. 7B, although a signal responding to a change in an input signal is outputted from the assist controller 24b, a sharp change is generated in the output signal in a vicinity of an integrated upper limit value.

The controller 241 provided at the last stage, as described above, is configured to respond to a comparatively high frequency band in order to secure the stability of the system. Further, when an integrated value is changed to or is limited to the integrated upper limit value, the output limiting integrator 242 receives the limitation and hence causes a high frequency component that causes a sharp change in the output value of the integrator. For this reason, when a signal limited in output is inputted to the controller 241, a high frequency component is amplified to thereby cause a sharp change in an output signal. In contrast to this, in the assist controller 24 of the present embodiment, as shown by solid lines in FIG. 7A and FIG. 7B, a sharp change in the output signal can be restricted.

Figure 9:
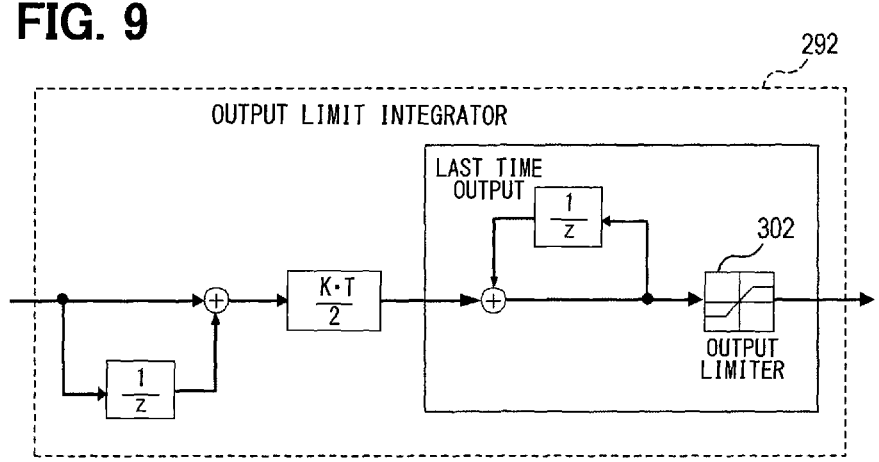
FIG. 9 is a diagram showing another configuration of an output limiting integrator including discrete elements.

In this regard, the assist controller 24 of the present embodiment has the output limiting integrator 242 configured in the manner shown in FIG. 6, thereby producing the operation and advantages described above. In the case where the output limiting integrator has a configuration in which an output limiter 302 is provided at the last stage, for example, like an output limiting integrator 292 shown in FIG. 9, a value before the output being limited in the integration calculation is used as the immediately previous output value and hence the operation and the advantages are the same as the assist controller 24a shown in FIG. 8A. In FIG. 9, T indicates a sampling time.

In the present disclosure, the ECU 15 corresponds to the steering control apparatus, the deviation calculator 23 corresponds to a torque deviation generator, the assist controller 24 together with the load estimator 21 and the target generator 22 corresponds to a command value generator, and the output limiting integrator 242 corresponds to an integrator.

In the above embodiment, the integrator 242 is configured to perform an integration calculation by using an output upper limit value, to which the output limit is set by the output limiter, as the immediately previous output value. Alternatively, the integrator 242 may be configured so that an absolute value of an integrated value to be outputted is limited to a value equal to or lower than a predetermined integrated upper limit value and is provided at a last stage of the command value generator 24.

According to the steering control apparatus 15 configured in above-described manner, the output value (integrated upper limit value), to which the output limit is set, is used as the immediately previous output value of the integrator, which is used at the time of performing the integration calculation, so that a reset windup phenomenon can be restricted. Further, the output limiting integrator is provided at the last stage of the command value generator, so that it is possible to restrict the driver from receiving an uncomfortable feeling (assist torque vibration) when the driver operates the steering wheel of the vehicle.

Other Embodiments

In the embodiment described above, the upper limit value of the absolute value (integrated upper limit value) of the output from the output limiting integrator 242 is set to a value obtaining by multiplying the absolute value of the steering torque Ts by specified times. The integrated upper limit value may be appropriately determined as necessary in a different manner. For example, the integrated upper limit value can be set based on, in place of the steering torque Ts, the state quantity of, for example, the rotation angle of the steering wheel, the rotation angle of the motor 6, or the basic assist command Tb* so that the integrated upper limit value increases with an increase of the state quantity.

The output limiting integrator 242 described in the embodiment may be configured so that in a case where a difference between signals before and after the output limiter 302 is equal to or greater than a specified value, the integrator may maintain the immediately previous value by deactivating the integration.

In the embodiment described above, the basic assist unit 20 is configured to generate the basic assist command Tb* based on the steering torque Ts and the vehicle speed V. As another example, the basic assist unit 20 may be configured to generate the basic assist command Tb* based on (i) only the steering torque Ts, or (ii) based on the steering torque Ts, the motor speed ω, and the vehicle speed V.

In the embodiment described above, the value acquired by adding the correction torque command Tr generated by the correction unit 30 to the basic assist command Tb* generated by the basic assist unit 20 is made the assist torque command Ta to be supplied to the current FB unit 42. As another example, the correction unit 30 may be omitted and the basic assist command Tb* may be used as the assist torque command Ta.

In the embodiment described above, the estimated load Tx is generated from the basic assist command Tb* and the steering torque Ts in the load estimator 21. As another example, in place of the basic assist command Tb*, the flowing current Im detected by the current FB unit 42 may be used.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A steering control apparatus that controls steering characteristics by controlling a motor to output an assist torque, the assist torque being generated corresponding to a steering torque applied to a steering shaft that is coupled to a steering member, the steering control apparatus comprising:
   a central processing unit (CPU);
   a non-transitory computer-readable storage medium; and
   a set of computer-executable instructions stored on the computer-readable storage medium that cause the central processor to implement:
      a torque deviation generator configured to generate a difference between the steering torque applied to the steering shaft and a target steering torque as a torque deviation, wherein the target steering torque is a target value of the steering torque applied to the steering shaft; and
      a command value generator configured to generate an assist torque command value to be used for controlling the motor based on a basic command value, wherein the basic command value is a command value that controls the torque deviation to be reduced to zero,
   wherein the command value generator includes:
      an integrator integrating the torque deviation and outputting the integrated torque deviation;
      an output limiter setting an output limit to an immediately previous basic command value, which is obtained immediately before the basic command value, and the output limiter generating the assist torque command value using the immediately previous basic command value to which the output limit is set; and
      a controller including a differential element and a proportional element, the controller disposed at a stage before the output limiter, and
   wherein the motor is controlled based on the basic command value.

2. The steering control apparatus according to claim 1, wherein the integrator integrates the torque deviation using the immediately previous basic command value to which the output limit is set by the output limiter.

3. The steering control apparatus according to claim 1, wherein the integrator limits an absolute value of the integrated torque deviation to be equal to or lower than a predetermined integration upper limit, and the integrator is disposed at a last stage of the command value generator.

4. The steering control apparatus according to claim 3, wherein the predetermined integration upper limit is set based on at least one of the steering torque applied to the steering shaft, a rotation angle of the steering member, a rotation angle of the motor, or the assist torque command value.

5. A steering control apparatus that controls steering characteristics by controlling a motor to output an assist torque, the assist torque being generated corresponding to a steering torque applied to a steering shaft that is coupled to a steering member, the steering control apparatus comprising:
- a logic circuitry comprising of only hardware, the logic circuitry further comprising a torque deviation generator and a command value generator;
- wherein the torque deviation generator is configured to generate a difference between the steering torque applied to the steering shaft and a target steering torque as a torque deviation, the target steering torque is a target value of the steering torque applied to the steering shaft,
- the command value generator is configured to generate an assist torque command value to be used for controlling the motor based on a basic command value, the basic command value is a command value that controls the torque deviation to be reduced to zero,
- the command value generator includes:
  - an integrator integrating the torque deviation and outputting the integrated torque deviation;
  - an output limiter setting an output limit to an immediately previous basic command value, which is obtained immediately before the basic command value, and the output limiter generating the assist torque command value using the immediately previous basic command value to which the output limit is set; and
  - a controller including a differential element and a proportional element, the controller disposed at a stage before the output limiter, and
- the motor is controlled based on the basic command value.

* * * * *